INVENTOR
THOMAS B. SAGER

BY Sherman Levy  ATTORNEY

United States Patent Office 3,586,555
Patented June 22, 1971

3,586,555
APPARATUS AND METHOD OF CONTINUOUSLY JOINING THERMOPLASTIC COATED WIRES
Thomas B. Sager, Plymouth Valley, Pa., assignor to Ultrasonic Systems, Inc., Farmingdale, N.Y.
Filed Aug. 1, 1969, Ser. No. 846,741
Int. Cl. H01b *13/06;* B29c *27/08*
U.S. Cl. 156—55        6 Claims

ABSTRACT OF THE DISCLOSURE

An apparatus and method of joining a plurality of thermoplastic coated wires in a continuous process by means of a molecular bond between adjacent wires and permitting each wire to be color coded for installation purposes. The molecular bond is sufficient to maintain the wires in assembled joined relation but permitting the wires to be separated for installation purposes.

BACKGROUND OF THE INVENTION

(1) Field of the invention

This invention relates generally to the joining of various devices by means of kinetic energy and relates particularly to the joining in a continuous manner of elongated elements having thermoplastic coverings such as electric wires or the like of undetermined length.

(2) Description of the prior art

Heretofore many efforts have been made to join together a plurality of elongated elements such as electricity carrying wires or the like having an insulating coating, including by taping the wires together, by encasing the wires in a common sleeve and by other methods which required a substantial amount of hand labor in order to produce a neat, tidy bundle in electrical assemblies. Some efforts have been made to seal the wires together by the use of adhesive, and a few efforts have been made to ultrasonically seal the wires together. These prior efforts have left much to be desired since the wires which were taped together or were arranged within a common sleeve required much hand labor and consumed an excessive amount of time. The wires which were joined by adhesive sometimes adhered to portions of the structure to which they were not supported to adhere. In some instances such as the patent to Obeda No. 3,440,118, an ultrasonic seal or tacking was applied to a series of thermoplastic coated wires at spaced intervals along the length thereof in an effort to maintain the wires in assembled relation, however, these efforts have not been entirely satisfactory since it was necessary to retain the wires within a recess of fixed dimensions during the tacking process so that a different tool was required for each size of wire and for each number of wires being joined together.

SUMMARY OF THE INVENTION

The present invention is an apparatus and method of continuously joining thermoplastic coated wires by a molecular bond in such a manner that the individual wires can be color coded for ease of assembly but can be separated for connecting the ends of the wire to various electrical elements. The apparatus includes an ultrasonic sealer or horn connected to a transducer for imparting vibratory waves to the horn which in turn transmits such waves to electrical wires with which they are in contact. The thermoplastic coated wires are disposed within an angular recess carried by an anvil or base member. Due to the angle relationship between the horn and the wires carried within the recess both vertical and lateral forces will be imparted to the wires to force the wires together for proper sealing and both shear and longitudinal vibration waves will be transmitted from the horn to the thermoplastic coating of the wires.

It is an object of the invention to provide apparatus for continuously applying a molecular bond to multiple elongated members as such members are moved between an ultrasonic horn and an anvil.

Another object is to provide a molecular bond between a plurality of elongated members having thermoplastic coatings in such a manner that the members can be separated when desired without damage to the coatings.

DESCRIPTION OF THE PREFERRED EMBODIMENT

Figure 1:
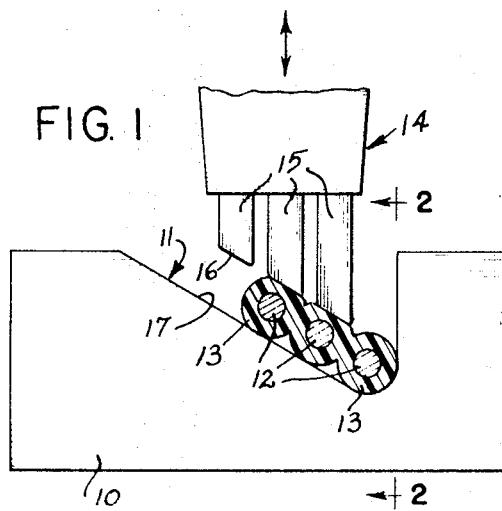
FIG. 1 is a side elevation illustrating one application of the invention.

With continued reference to the drawing, a base or anvil 10 is provided having an angular recess 11 in its upper surface. The recess can be disposed at any desired angle from a few degrees from a horizontal plane to a few degrees from a vertical plane. The angularity of the recess will be determined by the number and size of wires to be bonded together molecularly. Within the recess 11 two or more elongated members 12 such as electric wires or the like are located, and each of such wires is provided with a thermoplastic coating 13.

Disposed above the anvil 10 is an ultrasonic tool or horn 14 having one or more blades 15 depending therefrom with the lower surface 16 of the blades being substantially parallel with the upper surface 17 of the angular recess. The horn 14 is connected to an ultrasonic transducer (not shown) adapted to impart kinetic energy in the form of ultrasonic vibrations to the horn 14. Such horn is adapted to be moved in a generally vertical plane into and out of engagement with the wires 12.

As illustrated in FIG. 1, the horn 14 is provided with three blades 15, and the height between the first and last blades is important because the energy generated at each blade will vary due to the angular relationship of the lower surfaces 16. It is important to realize that sine and cosine waves are transmitted from the transducer to the horn, and therefore the length of the horn is important since it should be located at the point of maximum amplitude of vibrations. If the size of the wire 12 is relatively large, the angular relationship of the lower surfaces 16 of the blades relative to a horizontal plane must be correspondingly small so that substantially the same magnitude of vibrations will be transmitted to each of the blades 15. If the size of the wire is relatively small, the angle of the lower surface 16 relative to a horizontal plane can be increased or the number of blades carried by the horn can be increased as long as the first and last blades receive substantially the same magnitude of vibrations.

In the operation of this modification, two or more wires 12 are placed within the angular recess 11 of the anvil 10 after which the horn 14 is lowered until the lower surface 16 of the blades engages the thermoplastic coating of the wires. The lowermost blade engages the second wire and applies a downward pressure thereto and the angle of the anvil recess causes the second wire to move laterally into intimate engagement with the lowermost wire. The downward movement of the horn 14 will force the wires downwardly in engagement with the surface 17 of the recess and laterally against the next lower wire so that any desired member and size of wire can be placed within the recess and sealed as long as one of the blades 16 engage each wire. When the transducer is energized a kinetic energy in the form of ultrasonic vibrations will be transmitted through the horn and blades to the wires, and such vibrations will create an internal heat which molecularly bonds the thermoplastic coating of one wire to the thermoplastic coating of the next adjacent wires. While the wires are being bonded together, such wires are being mechanically pulled through the recess 11 by any desired apparatus (not shown) so that such wires are continuously sealed for the entire length thereof. Due to the movement of the wires through the recess 11, both shear and longitudinal vibratory waves will be transmitted to the wires. The wires are of indeterminate length and the independent wires normally are maintained on a reel or the like and fed into the angular recess in any desired manner. After the wires have been bonded together into a substantially continuous ribbon they are wound onto a spool from which any desired length can be removed. Due to the pulling of the wires through the anvil 10 and the relatively short sealing time, the molecular bond is sufficient only to fuse the exterior portions of the thermoplastic coating together so that there is substantially no intermixing of plastic material, particularly where each wire is of a different color. When the wires are to be used they can be merely pulled apart so that opposite ends of each of the wires can be connected to electrical elements.

Figure 4:
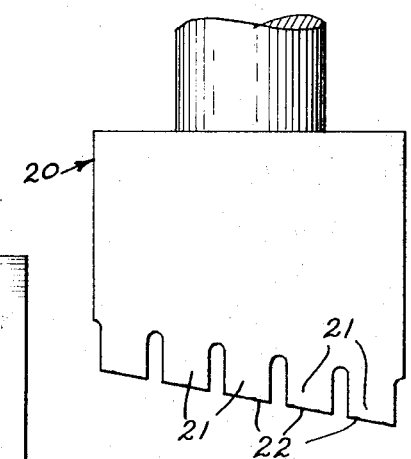
FIG. 4 is a side elevation of a modified form of ultrasonic horn.
Figure 3:
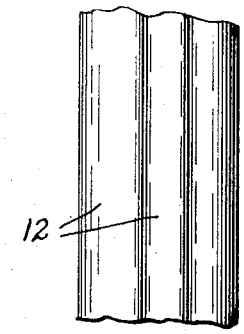
FIG. 3 is a top plan view of a plurality of wires which have been joined together.
Figure 2:
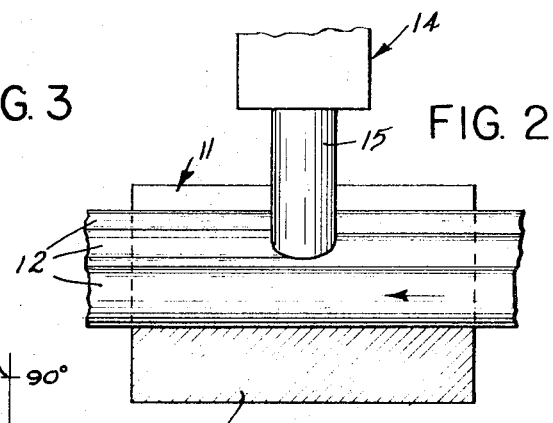
FIG. 2 is a section on the line 2—2 of FIG. 1.

With reference to FIG. 4, a modified form of the horn 20 is illustrated having a plurality of blades 21 each having a lower surface 22 disposed at an angle corresponding generally to the surface 17 of the angular recess 11. As illustrated, the angle between the first and last blades is relatively small so that the horn provides substantially a maximum amplitude of vibrations to each of the blades while applying downward and lateral force to the wires.

Figure 5:
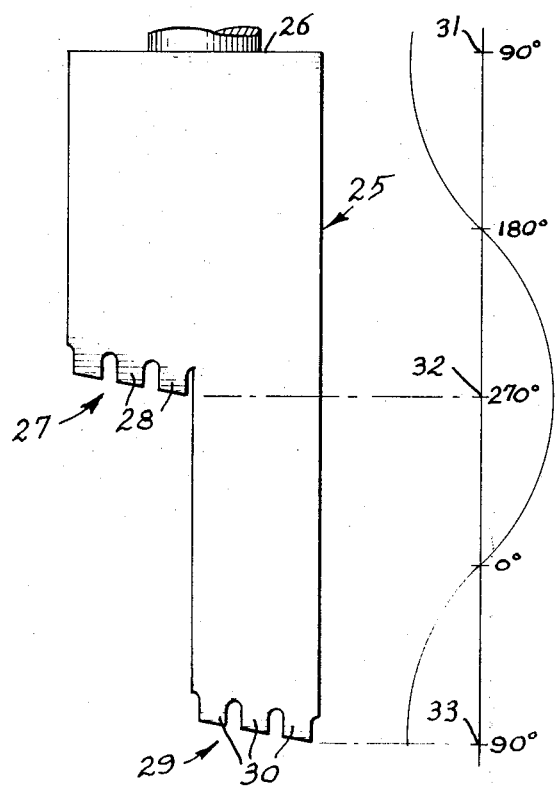
FIG. 5 is a side elevation of a further modified form of ultrasonic horn with a schematic representative of a sine or cosine wave and illustrating two or more sealing stations for a single horn.

With reference to FIG. 5, a full wave horn is illustrated which is adapted to molecularly bond multiple thermoplastic coated wires at two separate levels. This modification includes a horn 25 having one end 26 adapted to be connected to a transducer (not shown). A first sealing station 27 having a plurality of blades 28 is disposed substantially midway of the horn 25 and a second sealing station 29 having a plurality of blades 30 is located at the opposite end of the horn. This modification has three areas of maximum amplitude disposed over the length of the horn. The first area is attached to the drive transducer at 90 degrees of a sine or cosine wave at a point indicated at 31. The first sealing station 27 is located at 270 degrees of the sine or cosine wave at a point indicated at 32 and the third area is located at 90 degrees on the sine or cosine wave and indicated by the point 33. In this structure there are two nodal points located at zero degrees and 180 degrees of the sine or cosine wave, and these points do not vibrate. The magnitude of vibrations at the first and second sealing stations 27 and 29 are substantially equal; therefore, a multiple sealing operation can be achieved with this type of horn. Also, if desired, additional sealing stations could be provided along the length of the horn by locating the sealing stations in substantially the same relationship as that of the first two stations.

When it is desired to join relatively large wires together a plurality of individual horns each carrying one or two blades can be provided. Preferably such horns are staggered along the length of the anvil 10 so that the horns will then apply both downward and lateral forces to at least one wire and force such wire against the surface 17 of the recess 11 as well as against the next lower wire while the multitude of vibrations of the individual blades is substantially the same so that the wires will be sealed together.

From the above it will be apparent that a plurality of thermoplastic coated wires are connected together by a molecular bond in a continuous process and such bond will be continuous of substantially the entire length of the wires. Preferably the wires are not permanently fused together but instead can be pulled apart for connecting various elements without tearing or otherwise removing the coating from the wire.

While a preferred embodiment in accordance with the present invention has been illustrated and described, it is understood that various modifications may be resorted to without departing from the spirit and the scope of the appended claims.

What is claimed is:

1. Apparatus for continuously joining thermoplastic coated elongated members comprising an anvil having an angular inclined plane for the reception of a plurality of elongated members each of which has a thermoplastic coating, said plane having a shoulder providing stop means at one end thereof such that the end member of the elongated members abut the stop means, means for applying kinetic energy to said members to provide a molecular bond between adjacent members, said means being movable in a generally vertical plane to apply both vertical and lateral forces to said members while such members are being continuously moved along the inclined plane, whereby said means for producing kinetic energy will impart both shear and longitudinal vibration waves to said elongated members as the lateral forces are maintained and cause a molecular bond between the coating thereof.

2. The structure of claim 1 in which said means for providing kinetic energy includes an ultrasonic horn having at least one blade.

3. The structure of claim 2 in which said ultrasonic horn includes at least two sealing stations located at different levels.

4. The method of continuously joining a plurality of thermoplastic coated members comprising the steps of: providing an anvil with an angular inclined plane in its upper surface having stopping means at the lower end of said angular inclined plane placing a plurality of thermoplastic coated members on said angular plane with the end thermoplastic member abutting said stopping means, providing an ultrasonic horn having at least one blade over said anvil, moving said blade into intimate engagement with said members to apply both vertical and lateral forces causing lateral movement between the members to effect intimate engagement therebetween and applying ultrasonic vibrations thereto in the form of shear and longitudinal waves to be imparted to the thermoplastic coated members as said lateral forces are maintained, and moving said members through said spacing defined by said angular inclined plane and said blade while said vibrations are being applied to continuously join said thermoplastic coated members.

5. The method as defined in claim 4, wherein said bond between said thermoplastic coated members is sufficient only to fuse the exterior portions of the thermoplastic coating wherein the members may be separated.

6. The method as defined in claim 4, wherein said vibratory energy is not applied to the end coated member.

References Cited

UNITED STATES PATENTS 3,146,141   8/1964   Woodland _____ 156—73
3,440,118   4/1969   Obeda _____ 156—73

BENJAMIN A. BORCHELT, Primary Examiner

H. J. TUDOR, Assistant Examiner

U.S. Cl. X.R.

156—73